Figure 1:
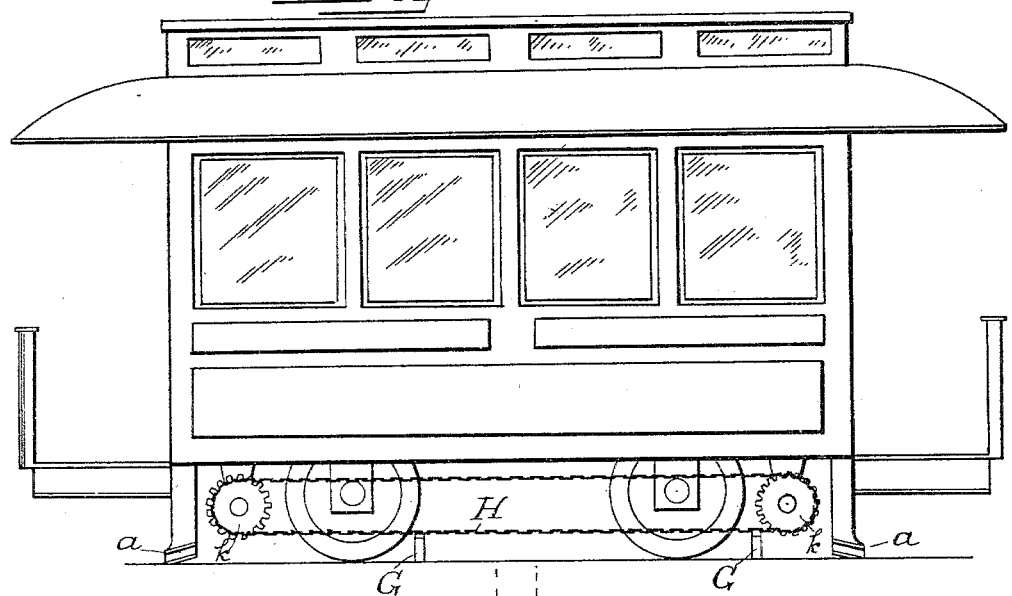

(No Model.) 2 Sheets—Sheet 1.

C. SKINNER.
ELECTRIC RAILWAY.

No. 566,542. Patented Aug. 25, 1896.

Witnesses
L. S. Thomason.
A. J. Robinson

Inventor
Courtland Skinner
By his Attorney
Frank W. Thomason (No Model.) 2 Sheets—Sheet 2.

C. SKINNER.
ELECTRIC RAILWAY.

No. 566,542. Patented Aug. 25, 1896.

UNITED STATES PATENT OFFICE.

COURTLAND SKINNER, OF CHICAGO, ILLINOIS.

ELECTRIC RAILWAY.

SPECIFICATION forming part of Letters Patent No. 566,542, dated August 25, 1896.

Application filed March 7, 1895. Serial No. 540,832. (No model.)

*To all whom it may concern:*

Be it known that I, COURTLAND SKINNER, a citizen of the United States, and a resident of Chicago, Cook county, Illinois, have invented certain new and useful Improvements in Electric Railways, of which the following is a full, clear, and exact description, reference being had to the accompanying drawings.

My invention relates to electric railways which have the current-wire laid in a sealed conduit placed alongside of and parallel to the track-rail, and my object is to provide circuit-closing devices for conducting the current from said current-wire to the car, said circuit-closing devices being operated by mechanical means that are actuated by the car.

My invention consists, generally speaking, of the peculiar construction of the said circuit-closing devices, whereby, among other things, short-circuiting or loss of current by reason of the presence of moisture or water on the tracks is avoided; and it consists, furthermore, of a peculiar construction of the collector carried by the car, whereby a conductor located exteriorly to and integral with the rail is dispensed with, substantially as hereinafter fully described, and as illustrated in the drawings, in which—

Figure 2:
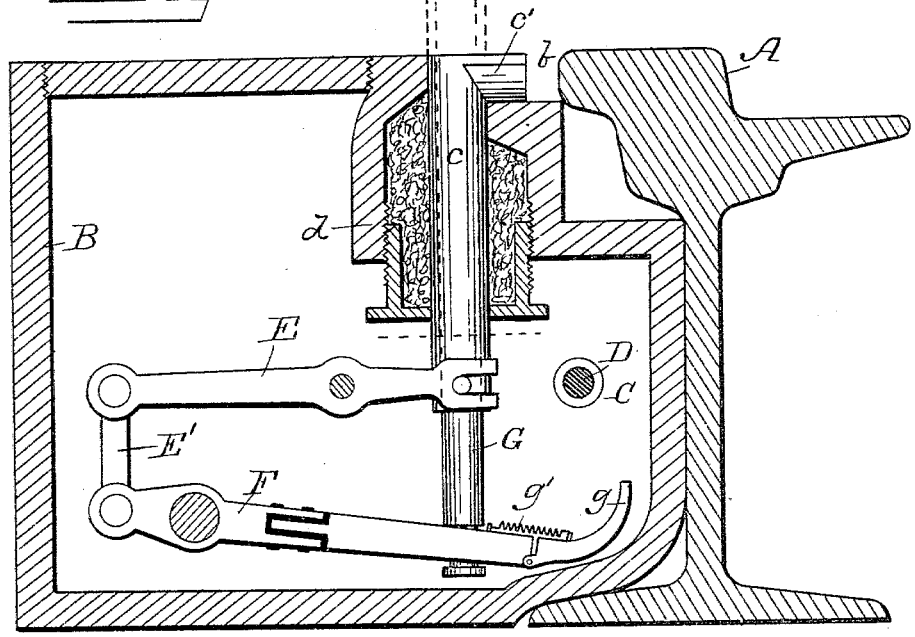
Figure 3:
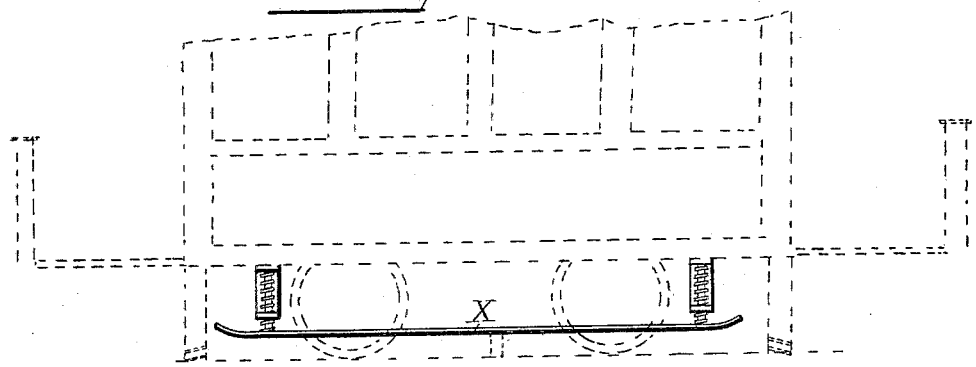
Figure 4:
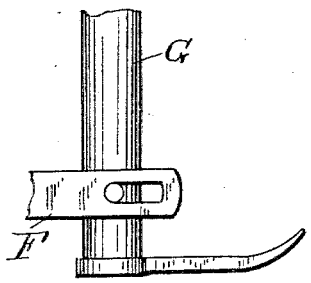
Figure 5:
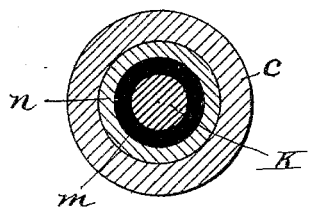

Figure 1 is a side elevation of a car, showing the means carried thereby for collecting the current and showing all the other features of my invention coming above the plane of the surface of the road. Fig. 2 is a transverse vertical section through the track-rail and one of the sealed boxes containing the circuit-closing devices. Fig. 3 is a detail view showing a modified form of the collector carried by the car. Fig. 4 is a detailed view showing in elevation the lower end of the contact-post and contiguous end of the lever operating the same. Fig. 5 is a detailed view showing a cross-section of said contact-post and plunger within which it moves.

Referring to the drawings, A represents the track-rails.

B B represent sealed boxes, the walls of which are made rigid and which are of such shape and dimensions that they can be secured to the web of the rail A about as shown. These boxes are located at about seven and one-half feet apart, more or less, and are connected by longitudinal pipes or conduits C, through which the current-wire D is laid but thoroughly insulated therefrom. The current-wire D extends through suitable openings in the ends of said boxes and passes through the same, and that portion of the wire within the box is naked and bare of all insulation. In order to actuate the circuit-closing devices so that the current can be transmitted from the naked portion of the current-wire in said boxes, I provide each end of the car with plows $a$ $a$, each of which may be preceded by a brush, if desired, and the pointed extremity of each of which extends to a point just outside of the track-rail slightly below the surface of the ball of said rail. As the car advances the point of the plow on the forward end thereof enters the longitudinal groove $b$ in the top of each box, parallel and adjacent to the rail A, and comes under and raises a plunger $c$. This plunger is hollow or cored out its entire length, and its upper end is provided with a lateral offset $c'$, which enters said groove and is so shaped that it can be conveniently engaged by said plow. It (the said plunger) moves in suitable bearings $d$, which are thoroughly packed, so that neither dust nor water can pass therethrough into the interior of the box. Pivotally connected to the lower end of this plunger is the short end of a lever E, which extends from said plunger at right angles to the length of the current-wire and diametrically opposite thereto. The extremity of the longer arm of lever E is connected, preferably, by the link E' to the short arm of a lever F, located below and extending in the same transverse plane as said lever E. The longer arm of this lever F extends under and past the vertical plane of the plunger, and a short distance from the fulcrum thereof it is so constructed that it is insulated from the remainder of said lever.

Extending longitudinally down through the bore of plunger $c$ is a contact-post G, consisting of a core of copper or other suitable metal K, with a layer of insulating material m enveloping it and a tube of steel n or other material inclosing the whole. The lower end of this post G extends through the insulated portion of the longer arm of lever F, and is connected or articulated thereto in such manner that said lever will be free to oscillate and reciprocate said post. A short distance beyond the lower end of post G the longer arm of lever F has an extension g, pivoted or hinged thereto, which is kept normally in alinement with the rest of the lever by means of a spring g', substantially as shown. This extension g is of such length and curvature and the position of the current-wire is such that when the longer arm of lever F moves upward said extension comes in contact with the current-wire and remains in contact therewith while said lever is in its upward position. Now the extension g is, either through the insulated portion of the longer arm of lever F or otherwise, electrically connected to the copper core of the post G, and when the plunger c is raised, by means carried by the passing car, the post G, through the medium of levers E and F, is shot up through said plunger, so that its upper end is four or five inches above the level of the exposed surface of the box. It is apparent that the extent of this upward projection of the post depends upon the system of leverage employed, and it is obvious that this leverage may be changed or adjusted, as desired, to suit the requirements of the particular case in which it is desired to use my invention.

When the post G is moved to the limit of its upward movement, its core is electrically connected to the current-wire, as hereinbefore explained, and a collector carried by the car comes in contact therewith and transmits the current derived therefrom through suitable electrical connections to the motor of said car. This collector may consist of a longitudinal plate X, arranged horizontally alongside the car in such position as to come in contact with the metal core of the post when in its elevated position, as shown in Fig. 3. I prefer, however, to provide an endless chain belt H, which travels around the sprockets k k, journaled in suitable hangers depending from the car, and to arrange this chain in such position that its lower stretch will engage the upper ends of the posts G and take current therefrom, the current being taken from the chain and conveyed by suitable electrical connections to the motor of the car. By the use of this chain there is practically no strain on the posts G at all, as the lower stretch of said chain is free to move in a rearwardly direction just as fast as the car moves forward.

The posts are held in their raised position by the friction of their guide-bearings and packing, and also by the side pressure of the chain belt H as the car moves over the same, and are successively restored to their original normal positions, as shown in Fig. 2, by reason of the under side or heel of the plow located at the rear end of the car coming in contact with the offset of said plunger and pushing it down after the said post has passed out of contact with the collector.

What I claim as new is—

1. In an electric railway, the combination with a car, plows depending from each end thereof, the motor therefor and electric collector, of a sealed box, current-wire insulated therefrom and extending therethrough, a vertical plunger engaged by said plows, a vertical contact-post normally disconnected from said wire, and devices for mechanically connecting said plunger and contact-post whereby said post is moved upward and establishes an electrical connection between said wire and collector when said plunger is raised, and which disconnects the same when said plunger is depressed.

2. In an electrical railway the combination with a car, plows depending from each end thereof, the motor therefor and electric collector carried by the same, of a sealed box, current-wire insulated therefrom and extending therethrough, a vertical plunger engaged by said plows, a vertically-reciprocal contact-post moving longitudinally through said plunger and normally disconnected from said current-wire, and devices for connecting said plunger and contact-post whereby said contact-post is moved upward and establishes an electrical connection between said wire and the collector when said plunger is raised, and disconnects the same when said plunger is depressed.

3. In an electric railway, the combination with a car, plows depending from each end thereof, the motor for said car and the collector therefor, of a sealed box current-wire insulated therefrom and extending therethrough, a vertical plunger engaged by said plows, a vertically-reciprocal contact-post, the levers E, F, connecting said plunger and post, said lever F having an extension, as described, which, when the post moves upward comes in contact with said wire, and through the same and said post electrically engages with said collector.

4. In an electric railway the combination with a car, the motor therefor and a collector carried thereby and extending horizontally a suitable distance from one end to the other of the car, of a sealed box, current-wire insulated therefrom, a vertical plunger engaged by said car, a vertical contact-post normally disconnected from said wire, and devices for connecting said plunger and contact-post whereby said plunger and post are simultaneously moved upward and said post electrically connected to said current-wire, and disconnected therefrom when said plunger is depressed.

5. In an electric railway the combination with a car, the motor therefor and collector carried thereby, of a sealed box, current-wire insulated therefrom, a vertical plunger engaged by said car, a vertically-reciprocal contact-post within said plunger and normally disconnected from said current-wire, said plunger and said post being simultaneously moved upward whereby said post is electrically connected to said current-wire and simultaneously moved downward, thereby disconnecting said post from said wire.

COURTLAND SKINNER.

Witnesses:
 FRANK M. SAVAGE,
 FRANK D. THOMASON.